July 29, 1941. A. F. MEYER 2,250,676
LIQUID LEVEL INDICATOR
Filed Feb. 17, 1938
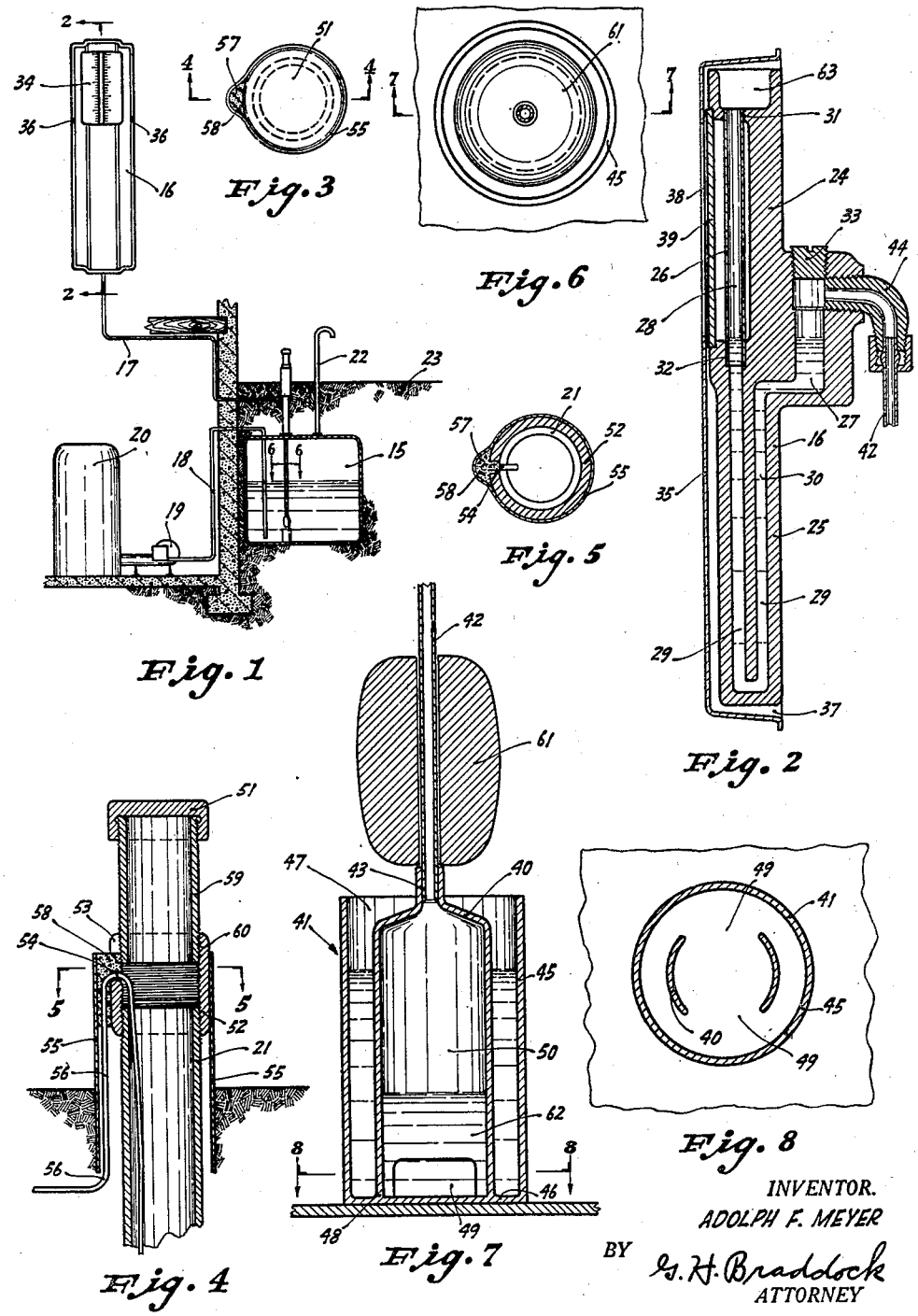
INVENTOR.
ADOLPH F. MEYER
BY G. H. Braddock
ATTORNEY Patented July 29, 1941

2,250,676

UNITED STATES PATENT OFFICE 2,250,676

LIQUID LEVEL INDICATOR

Adolph F. Meyer, Minneapolis, Minn.

Application February 17, 1938, Serial No. 191,019

4 Claims. (Cl. 73—299)

The present invention has relation to a liquid level indicator.

This application relates to improvements over the invention of my pending application Serial No. 82,307, for Liquid level indicator, filed May 28, 1936.

An object of the invention is to provide a liquid level indicator wherein will be incorporated various improved features and characteristics of construction novel both as individual entities of the liquid level indicator and in combination with each other.

A further object is to provide in a liquid level indicator, a novel and improved construction and arrangement of mechanism, for association with a tank or vessel to contain liquid, such as oil, the level of which is to be indicated or measured and with a gage or manometer for indicating the liquid level, through the instrumentality of which the liquid level in said tank or vessel can be indicated at said gage or manometer.

A further object is to provide a mechanism for operatively connecting a tank or vessel to contain liquid or oil the level of which is to be indicated or measured with a gage or manometer for indicating the level of liquid or oil in said tank or vessel, which will be associated with the tank or vessel in novel and improved manner.

With the above objects in view, as well as others which will appear as the specification proceeds, the invention comprises the construction, arrangement and combination of parts as now to be fully described and as hereinafter to be specifically claimed, it being understood that the disclosure herein is merely illustrative and intended in no way in a limiting sense, changes in details of construction and arrangement of parts being permissible so long as within the spirit of the invention and the scope of the claims which follow.

In the accompanying drawing forming a part of this specification:

Fig. 1 is a diagrammatic view of a liquid level indicator in which features and characteristics of the invention are incorporated, said view disclosing a tank or vessel adapted to contain liquid the level of which is to be indicated or measured, a gage or manometer, suitable for indicating or measuring pressure changes when caused by pressure increased above atmospheric pressure, for indicating liquid level in said tank or vessel, and mechanism operatively connecting the tank or vessel and the gage or manometer to each other;

Fig. 2 is an enlarged central vertical sectional view of the gage or manometer of Fig. 1, taken on line 2—2 in said Fig. 1;

Fig. 3 is an enlarged plan view of the filler pipe of the tank or vessel of Fig. 1, disclosing structure appurtenant to said filler pipe;

Fig. 4 is a sectional view, taken on line 4—4 in Fig. 3;

Fig. 5 is a sectional view, taken as on line 5—5 in Fig. 4;

Fig. 6 is an enlarged sectional view, on a scale considerably larger than that of Fig. 3, taken on line 6—6 in Fig. 1, disclosing the trap for housing the liquid separator or spacer of the liquid level indicator;

Fig. 7 is a sectional view, taken on line 7—7 in Fig. 6;

Fig. 8 is a sectional view, taken as on line 8—8 in Fig. 7.

A tank or vessel 15 is adapted to contain a liquid, such as oil, the level of which is to be indicated or measured. A gage or manometer 16 is constructed to measure pressure changes when caused by pressure increased above atmospheric pressure and to indicate the level of liquid or oil in the tank or vessel 15. Mechanism, represented generally at 17, extends between the tank or vessel 15 and the gage or manometer 16 to operatively connect said tank or vessel and said gage or manometer to each other.

The tank or vessel 15 may, for example, be an ordinary tank or vessel now of commerce for containing liquid fuel for use in a burner. In Fig. 1, a supply pipe 18 extends upwardly from the lower portion of the tank or vessel 15 through its top wall and leads to a pump 19 for a burner 20 which is to be supplied with oil or other liquid fuel. Customarily, tanks or vessels such as 15 are situated in basements of cellars or outdoors. The gage or manometer 16 may find one use as a distant reading gage situated in a kitchen or other room of a building for indicating level of liquid in a tank or vessel situated in the basement or cellar of said building, or situated outdoors. Said gage or manometer 16 and mechanism 17 can of course be employed to indicate level of liquid in any tank or vessel. The top wall of the tank or vessel 15 receives an ordinary filler pipe 21 and an ordinary vent pipe 22, which pipes as disclosed extend upwardly through the earth, denoted 23, to position above the surface.

The gage or manometer 16 is constructed principally of metal. It includes an upper body portion 24 of metal and a lower U-portion 25 also of metal integral with the upper body portion. A U-member of said gage or manometer is constituted by the upper-body portion 24 and lower U-portion 25, as well as by a transparent or glass tube 26 assembled with said body portion and U-portion. More specifically, said U-member of the gage or manometer has a compartment or leg 27 formed in the body portion 24, a compartment or leg 28 constituted by the transparent tube 26, and a passageway or leg 29 between and connecting the compartments or legs 27 and 28 and formed in the U-portion 24. The compartment or leg 28 normally has internal capacity or diameter smaller than the internal capacity or diameter of the compartment or leg 27, and the passageway or leg 29 has internal capacity or diameter smaller than the internal capacity or diameter of the compartment or leg 27. As disclosed, the internal capacity or diameter of the passageway or leg 29 is substantially equal to the internal capacity or diameter of the compartment or leg 28. Stated differently, the U-member of the gage or manometer 16 includes variable-sized compartments or legs 27 and 28 connected to each other by a passageway or leg 29 which has cross-sectional area smaller than the cross-sectional area of said compartment or leg 27. The compartments or legs 27 and 28 and the passageway or leg 29 have a medium, such as mercury 30, therein, adapted to be balanced against pressure to be measured. As disclosed, said medium or mercury is the indicating entity of the gage or manometer 16.

The compartment or leg 28, constituted by the transparent tube 26, is upstanding and is as disclosed of somewhat greater length than the compartment or leg 27. Said compartment or leg 28, or glass tube 26, is open at its upper portion and is in communication at its lower portion with the passageway or leg 29. The upper and lower portions of said transparent or glass tube 26 are fitted tightly into openings, indicated 31 and 32, respectively, of the metal body portion of the gage or manometer.

The compartment or leg 27 is also upstanding. The upper end of said compartment or leg 27 is covered by an air tight cap or nut 33. The compartment or leg 27 is at about the elevation of the lower portion of the compartment or leg 28, and is in communication at its own lower portion with the passageway or leg 29.

The passageway or leg 29 constitutes a U situated between the compartments or legs 27 and 28. The base of said U is horizontal and the arms are upstanding or vertical. It will be noted that the base of the U which said passageway or leg 29 constitutes is relatively short, while the arms are comparatively long for a purpose to be made clear.

The gage or manometer 16 is adapted to be supported in upright position, as upon a wall (not shown), in any suitable and convenient manner.

The transparent tube 26 and the mercury or medium therein stand in front of a vertically disposed scale 34 marked or placed in any ordinary or preferred manner upon the adjacent surface of the upper, body portion 24 of the gage or manometer 16. Said transparent tube is of length suitable to its purpose, and the scale 34 is suitably calibrated.

A casing or cover plate for the gage or manometer 16 is denoted 35. Said casing or cover plate is fitted up against the forward side of the metal body of said gage or manometer and may be secured thereto in any suitable and convenient way, as by screws 36. A flange 37 about the casing or cover plate 35 surrounds the top, bottom and side edges of the metal body and lower U-portion of the gage or manometer. The scale 34 is visible through an opening 38 in an upper portion of the casing or cover plate. A sight member 39, which may be glass, is disposed back of the opening 38 and is seated between the casing or cover plate and the body portion 24. The forward surface of said body portion 24 having the scale 34 is desirably of V shape. The transparent tube 26 is disposed in front of the apex of the V desirably at the midwidth of the gage or manometer so that portions of said scale 34 at either side of said tube slant forwardly and outwardly to be more easily readable from position in front of the gage or manometer. As disclosed, the scale 34 is calibrated directly upon the upper, body portion 24.

The mechanism 17, which extends between the tank or vessel 15 and the gage or manometer 16 and connects said tank or vessel and said gage or manometer to each other in such manner that the gage or manometer can indicate the level or liquid or oil in the tank or vessel, as before stated, includes a hollow member or bell 40, constituted as a part of a trap represented generally at 41, adapted to be positioned in a lower portion of the tank or vessel 15, and a small connecting pipe or capillary tube 42 which has one of its ends in communication with and tightly secured to the hollow member or bell 40, as at 43, and its other end in communication with and tightly secured to the compartment or leg 27 of the gage or manometer, as at 44. The location of communication between the connecting pipe or tube 42 and the compartment or leg 27 may be at an upper portion of the side wall of said compartment or leg 27, above the level of mercury 30 and below the closure cap or nut 33.

In addition to the hollow member or bell 40, the trap 41 includes an upstanding container 45 having a closed lower wall 46 adapted to rest upon the bottom wall of the tank or vessel 16 and an upper portion 47 freely open to liquid or oil and the pressure thereof when in said tank or vessel and surrounding said trap. The hollow member or bell 40 is as shown disposed within the container 45 in spaced relation to its upstanding side wall, and said hollow member or bell has its lower end suitably secured, as at 48, to the closed lower wall 46 of the container 45. The lower portion or portions of the vertical side wall of the hollow member or bell 40 include openings 49 affording communication between the lower portion of the interior of the container 45 and a chamber 50 defined by said hollow member or bell and in communication with the passage through the connecting pipe or capillary tube 42.

The trap 41 is of size sufficiently small to be passed downwardly into the tank or vessel 15 through the filler pipe 21. To the accomplishment of this procedure, the ordinary cap 51 for covering said filler pipe is removed. A coupling 52 of tubular form, best shown in Fig. 4, may be externally threaded upon the filler pipe in replacement of the ordinary covering cap 51. As disclosed, the coupling 52 includes an elongated slot 53 in its upper portion. The trap 41, with connecting pipe or capillary tube 42 attached thereto, may in practice be lowered into the tank or vessel 15 by way of the filler pipe 21, after the coupling 52 is applied. After said trap 41 has been placed upon the bottom of said tank or vessel, or at other desired elevation in the tank or vessel, the connecting pipe or capillary tube 42 may be bent, as at 54, to lie in said elongated slot 53. Thereafter, a shield 55, desirably of metal and of tubular form, may be disposed about the coupling 52 and a downwardly extending length 56 of the pipe or tube 42 at the outer side of the filler pipe and above the ground level. As shown, the shield 55 includes an irregular portion providing a space 57 of said shield at the interior thereof and adjacent the bend 54 of the pipe or tube 42 and the coupling 52. Desirably, said space 57 is filled with cement 58 which enters the elongated slot 53 and covers the portion of said pipe or tube 42 at and adjacent the bend 54 and thus protects said portion, especially at the otherwise exposed upper side thereof. A short piece of pipe 59 threaded into the coupling 52, as at 60, includes an external thread at its upper portion for receiving the ordinary covering cap 51 which was originally removed from the filler pipe 21, as before set forth. The downwardly extending length 56 of the pipe or tube 42 is as shown given a right-angle bend below the shield 55 and thence is suitably led to the gage or manometer 16.

As will be most clear from Figs. 6 and 7, means for holding the trap 41 down in the tank or vessel 15 may consist of one or more sinkers or weights 61. In the disclosure as made, the sinker or weight 61 is slidably arranged upon the capillary tube 42 and rests directly upon the upper portion of the hollow member or bell 40. The sinker or weight 61 is of size small enough to be passed downwardly through the filler pipe 21, and of course said weight is placed upon the capillary tube 42 before insertion of the trap with tube into the tank or vessel 15.

The employment of a capillary connecting tube 42 and trap 41 and sinker or weight 61 of size to be placed into the tank or vessel 15 through its filter pipe 21 is a matter of convenience of installation. The sinker or weight effectively maintains the trap in its proper position in the bottom of the tank or vessel. The arrangement is particularly convenient where the top of a liquid or oil tank or vessel is placed close to a ceiling, for example.

The upper portion of the chamber 50 of the hollow member or bell 40 and the connecting pipe or capillary tube 42, as well as the portion of the compartment or leg 27 above the level of mercury 30, will ordinarily contain air. As illustrated, a liquid separator or spacer 62 is situated in the lower portion of said chamber 50 and in the lower portion of the upstanding container 45, between air in the chamber 50 and liquid or oil in said container 45, both above said liquid separator or spacer. The liquid level indicator could of course be operative with a gas other than air in said chamber 50, capillary tube 42 and compartment or leg 27. The liquid separator or spacer 62 employed will be of nature to be substantially not miscible with each of the air or gas at one side thereof, in the chamber 50, and the liquid or oil at the opposite side thereof, in the container 45, and will constitute a permanent seal between said air or gas and said liquid or oil. Continued tests have demonstrated that moisture in the air or gas in a mechanism such as 17 but omitting a liquid separator or spacer such as 62 causes more or less erratic indication at a gage or manometer such as 16 because of the variation of vapor pressure with temperature. This holds particularly true where air used as the pressure-transmitting fluid is practically saturated. From the tests it has also been discovered that air or gas in a mechanism such as 17 and employing no liquid seal such as 62 has a tendency to be absorbed by oil in a tank or vessel such as 15. Where the oil is subject to more or less disturbance, the new oil may come in contact with the air or gas from time to time and thus gradually reduce the volume of the pressure-transmitting fluid so as to result in incorrect indications at the gage or manometer. In short, the experiments made prove that oil rapidly absorbs air in contact with it and continually permits air to escape around the lower end of a hollow member or air bell such as 40, but employing no liquid seal, through the oil and into the tank or vessel. The trap with liquid separator or spacer illustrated and hereinbefore described overcomes both of the difficulties before mentioned, namely erratic indication because of variation of vapor pressure with temperature and because of absorption of air. The liquid separator or spacer employed is of course heavier than the liquid or oil in the tank or vessel 15. Said liquid separator or spacer may be of any composition suitable to its purposes, as, for example, glycerine, diethylene glycol, Prestone, ethylene glycol, hygropon tech N, hygropon tech extra, and various combinations of these liquids may be used with certain oils. In any instance, it is desirable that the liquid separator or spacer utilized be of nature both to absorb the water vapor in the air until the remaining mixture is substantially nothing but oxygen and nitrogen gas which expands and contracts according to the laws of Boyle and Charles, to thus form a perfect pressure-transmitting fluid where the temperature is kept fairly constant and changes in barometric pressure are not really material, and to be not miscible with each of the air and oil, to thus prevent the air from being absorbed and the liquid separator or spacer from being dissipated even in small portion.

When the tank or vessel 15 is without liquid, the air or gas in the chamber 50, the capillary tube 42 and the portion of the compartment or leg 27 above the mercury or medium 30 will be at substantially atmospheric pressure. Also, the mercury in the compartments or legs 27 and 28 of the gage or manometer 16 will be at a single level, and said mercury, which is itself the indicating entity as disclosed, will be at the bottom of the scale 34 to indicate a zero reading for liquid in the tank or vessel 15. When the tank or vessel contains liquid, the liquid will enter the upstanding container 45 of the trap 41 and cause the liquid separator or spacer 62 to be moved to compress the air or gas in the chamber 50, the capillary tube 42 and the portion of the compartment or leg 27 above the mercury. Said air or gas will obviously be compressed in direct proportion to the depth of liquid at any particular time in the tank or vessel. The air or gas will transmit its pressure to the mercury 30 and this will indicate the level of the liquid on the scale 34.

To produce substantially uniform scale travel of the mercury 30 for variable depths and specific gravities of liquid to be measured, the relative internal capacities or sizes of the compartments or legs 27 and 28 are suitably changed. Also, in order to secure maximum accuracy, it is necessary to proportion said compartments or legs 27 and 28 in accordance with the length and diameter of the connecting pipe or tube 42, the size of the hollow member or bell 40 and the specific gravity of the trap fluid 62. Once the proportioning of the compartments or legs of the gage or manometer has ben determined upon, considerable latitude may be allowed in the length of the tube 42, provided a very small capillary tube is used, without substantial error except in an initial reading. The initial reading can be corrected by adding or substracting from the volume of mercury initially placed in the gage or manometer while under atmospheric pressure.

Upon increase of depth of liquid in the tank or vessel 15, or upon placing liquid of increased specific gravity in said tank or vessel, the internal capacity or size of the compartment or leg 27 is required to be reduced relatively to the internal capacity or size of the compartment or leg 28 in direct relation to the extent of increase of depth of liquid, or to the extent of increase of specific gravity of liquid, or to the extent of increase of both depth of liquid and specific gravity, to produce uniform scale travel. Conversely, upon decrease of depth of liquid the level of which is to be indicated or measured, or upon placing liquid of decreased specific gravity in the tank or vessel 15, the internal capacity or size of said compartment or leg 27 is required to be enlarged relatively to the internal capacity or size of the compartment of leg 28 in direct relation to the extent of decrease of depth of liquid, or to the extent of decrease of specific gravity of liquid, or to the extent of decrease of both depth and specific gravity, to produce uniform scale travel. Alteration as explained of the internal capacities or sizes of the compartments or legs 27 and 28 accomplishes uniform scale travel for variable depths and specific gravities of liquids to be measured by properly proportioning said compartments or legs 27 and 28 with respect to each other and with respect to the total extent of forward and rearward bodily movement of the pressure-transmitting fluid, air or gas, and thus predetermining the total extent of fluctuation of mercury 30 in the compartment or leg 28.

The gage or manometer 16 is so designed and constructed that throughout an intended operative or useful range of said gage or manometer there will be a large, operative or useful travel of the mercury or indicating entity, obtaining satisfactory scale travel, as well as a large, operative or useful travel of the pressure-transmitting fluid, in the hollow member or bell 40, the capillary tube 42 and the portion of the compartment or leg 27 above the mercury, actuated by fluctuations of level of liquid or oil in the tank or vessel 15, and throughout a safety or non-operative or non-useful range of the gage or manometer there will be a small, non-operative or non-useful travel of said mercury or indicating entity in said gage or manometer and said pressure-transmitting fluid actuated by fluctuations of liquid level, with resultant greatly increased resistance to the escape from the gage or manometer of said mercury and/or said pressure-transmitting fluid.

The scale 34, or more accurately, the total distance in either direction the mercury 30 travels relatively to the scale, represents the intended operative or useful range of the gage or manometer 16. As above set forth, the passageway or leg 29 constitutes a connecting channel between said compartments or legs 27 and 28 through which the mercury is conveyed from the compartment or leg 27 to the compartment or leg 28, and vice versa. During normal operation of the gage or manometer the quantity or mercury in the passageway or leg 29 is a fixed quantity which is relatively small in comparison to the total quantity, a considerable portion of the bulk of mercury being in the compartment or leg 27 when the liquid being measured is at its lowest level, in the compartment or leg 28 when said liquid is at its highest level, and partially in each of said compartments or legs 27 and 28 when the liquid being measured is at an intermediate level. In the accomplishment of upward movement of the mercury 30 from zero to the maximum measurement upon the scale 34, a large portion of the mercury is removed from the compartment or leg 27 and a corresponding amount of mercury passes into the compartment or leg 28. In the accomplishment of downward movement of the mercury from said maximum measurement to zero upon the scale, a large portion of the mercury is removed from the compartment or leg 28 and a corresponding amount of mercury passes into the compartment or leg 27. Each of the compartments or legs 27 and 28 is of size or capacity so that it would be somewhat less than full of mercury when the other compartment or leg was empty. As disclosed in Fig. 2, the body portion 24 of the gage or manometer includes a relatively large chamber 63 in its upper portion, above and communicated with by the transparent tube 26. Said chamber 63 is at elevation above the highest level of mercury 30 at any time in the compartment or leg 28 during operative or useful travel of said mercury and is open at its upper side. The total fluctuation of mercury level in the compartment or leg 27 between zero and maximum measurement on the scale 34 is normally less than in the compartment or leg 28 because the compartment or leg 27 is normally of greater cross-sectional area. Obviously, the total fluctuation of mercury level in said compartment or leg 28 between zero and maximum measurement on the scale is equal to the total distance through which the indicating entity of the scale, the mercury itself as shown, travels relatively to the scale while the gage or manometer is operative within its useful range. The pressure-transmitting fluid, in the hollow member or bell 40, the capillary tube 42 and the portion of the compartment or leg 27 above the mercury, actuated by fluctuations of liquid level in the tank or vessel 15, has total to and fro bodily movement while said gage or manometer is operative within its useful range directly proportional to the total fluctuation of mercury level in the compartments or legs 27 and 28.

The safety or non-operative or non-useful range of the gage or manometer 16 has correspondence to (1) forward bodily movement of the pressure-transmitting fluid in the hollow member or bell 40, the capillary tube 42 and the portion of the compartment or leg 27 above the mercury 30 forcing the mercury downwardly in and from said compartment or leg 27 and the passageway or channel 29 and upwardly in and from the compartment or leg 28 and into the chamber 63, by reason of excessive pressure in the tank or vessel 15, from and above the position of the mercury which obtains maximum measurement on the scale; and (2) rearward bodily movement of said pressure-transmitting fluid pulling or sucking the mercury upwardly in the compartment or leg 27 and downwardly in and from the compartment or leg 28 and the passageway or channel 29, by reason of pressure less than atmospheric pressure in said tank or vessel, from and below the position of the mercury which obtains zero measurement on said scale.

When the mercury 30 is positioned to give the maximum scale reading, substantially all of the mercury is removed from the compartment or leg 27. When forward bodily movement of the pressure-transmitting fluid forces the mercury downwardly in and from said compartment or leg 27 and the passageway or channel 29 and upwardly in the compartment or leg 28 and into the chamber 63 from and above the position of the mercury obtaining maximum scale measurement, the quantity of mercury caused to travel into the compartment or leg 28 and the chamber 63, in response to a certain increase in pressure in the capillary tube 42, for example, is of considerably smaller amount than the quantity of mercury which travels from said compartment or leg 27 to said compartment or leg 28, in response to this same increase in pressure, within the operative or useful range of the gage or manometer 16, due to the relatively small cross-sectional area of the passageway, leg or channel 29 and the consequently small total quantity of mercury contained in said passageway, leg or channel. Also, the mercury rises at slower rate in the chamber 63 because of its greater cross-sectional area. When the indicating entity is positioned to give zero scale reading, substantially all of the mercury is removed from the compartment or leg 28, as disclosed in Fig. 2. When rearward bodily movement of the pressure-transmitting fluid pulls or sucks the mercury upwardly in the compartment or leg 27 and downwardly in and from the compartment or leg 28 and the passageway or channel 29 from and below the position of the mercury obtaining zero scale measurement, the quantity of mercury caused to travel into the compartment or leg 27, in response to a certain decrease in pressure in the capillary tube 42, for example, is of considerably smaller amount than the quantity of mercury which travels from the compartment or leg 28 to the compartment or leg 27, in response to this same decrease in pressure, within the operative or useful range of the gage or manometer 16, due to the relatively small cross-sectional area of the passageway or channel 29, as before mentioned. A really considerable force would be required to cause all of the mercury to become situated in either of the compartments or legs 27 or 28, and no mercury 30, or pressure-transmitting fluid in the hollow member 40, the capillary tube 42 and the upper portion of the compartment or leg 27 could be forced or drawn out of the gage or manometer while there was yet mercury in the passageway, leg or channel 29 in an instance where each compartment or leg 27 and 28 was constructed to be capable of alone holding all of the mercury. In the disclosure as made, the compartment or leg 27 is of size to alone hold all of the mercury, and the compartment or leg 28 with chamber or enlargement 63 is also of size to alone hold all of the mercury.

It will be seen that the construction and arrangement as illustrated and described provides for relatively great and satisfactory travel of the indicating entity throughout an operative or useful range of the gage or manometer 16, and also provides for greatly increased resistance to escape of the mercury 30 and the pressure-transmitting fluid, actuated by fluctuations of liquid level in the tank or vessel 15, throughout a safety or non-operative or non-useful range of the gage or manometer, said safety, non-operative or non-useful range being, in effect, at either end or side of the operative or useful range of said gage or manometer.

It has been stated that the upstanding or vertical arms of the passageway or leg 29 are comparatively long. The construction in this and other respects of the gage or manometer 16 as employed in any liquid level indicator installation is desirably such that said gage or manometer will have a safety factor of at least two. For example, if a given gage or manometer such as 16 is designed to indicate the pressure in a liquid or oil tank or vessel having four-foot depth, said gage or manometer will be safe even should eight feet of pressure be applied, and it will read correctly as soon as the excess pressure is removed. In any installation of the gage or manometer 16, constructed as illustrated and described and in the particular installation possessing a safety factor of at least two, there can obviously be no escape through the mercury 30 of any of the pressure-transmitting fluid until excess pressure has been applied to equal an amount of pressure greater than twice the amount the gage or manometer is designed or intended to be subjected to during its normal operation.

A gage or manometer such as 16, designed and constructed to possess a safety factor of at least two in any liquid level indicator in connection with which utilized, obviously has a very large range. Due to this large range, it is perfectly safe to employ the transparent or glass tube 26 in the construction after the fashion as already set forth. Should said tube 26 become broken away, there will still remain the metallic U-member having an upstanding or vertical portion of sufficient length to more than counterbalance maximum pressure due to a full tank of liquid or oil. In other words, the construction makes provision for employment of the quite desirable sight tube 26 as a direct indicator with an indestructible metal U-member which will preclude an opening of the pressure-transmitting fluid to the atmosphere even though said sight glass tube should become broken and entirely removed from the remainder of the gage or manometer.

What is claimed is:

1. In an apparatus of the character described, in combination, a manometer, a filler pipe for a vessel, a hollow member positioned below the filler pipe, said hollow member being of such diameter with respect to that of the filler pipe that it may be passed therethrough, a tube connected between said manometer and hollow member including a portion of the tube within said filler pipe and a different portion of the tube bent around an upper portion of the filler pipe, means for retaining said tube in fixed relation to said filler pipe and for shielding a portion of the tube adjacent and at the outer side of the filler pipe, and means for covering said filler pipe.

2. In a liquid level indicator for an underground vessel having an external filler pipe, said filler pipe having a slot, a hollow member constituted as an air trap positioned in a lower portion of said vessel, said hollow member being of such diameter with respect to that of the filler pipe that it may be passed therethrough, a manometer, and a tube connecting said hollow member to said manometer, said tube including a portion thereof disposed in said filler pipe, a bent portion thereof disposed in said slot and a portion thereof disposed at the outer side of said filler pipe and extending below the surface of the ground.

3. In a liquid level indicator for an underground vessel having an external filler pipe, said filler pipe having a slot, a hollow member constituted as an air trap positioned in a lower portion of said vessel, said hollow member being of such diameter with respect to that of the filler pipe that it may be passed therethrough, a manometer, a tube connecting said hollow member to said manometer, said tube including a portion thereof disposed in said filler pipe, a bent portion thereof disposed in said slot and a portion thereof disposed at an outer side of said filler pipe and extending below the surface of the ground, and means for retaining said tube in fixed relation to said filler pipe.

4. In a liquid level indicator for an underground vessel having an external filler pipe, said filler pipe having a slot, a hollow member constituted as an air trap positioned in a lower portion of said vessel, a manometer, a tube connecting said hollow member to said manometer, said tube including a portion thereof disposed in said filler pipe, a bent portion thereof disposed in said slot and a portion thereof disposed at an outer side of said filler pipe and extending below the surface of the ground, and means for shielding a part of said bent portion of said tube disposed at the outer side of said filler pipe.

ADOLPH F. MEYER.